United States Patent
Baxter

(10) Patent No.: US 10,455,028 B2
(45) Date of Patent: Oct. 22, 2019

(54) ALLOCATING EDGE SERVICES WITH LARGE-SCALE PROCESSING FRAMEWORK CLUSTERS

(71) Applicant: HEWLETT PACKARD ENTERPRISE DEVELOPMENT LP, Houston, TX (US)

(72) Inventor: Joel Baxter, San Carlos, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 453 days.

(21) Appl. No.: 15/001,735

(22) Filed: Jan. 20, 2016

(65) Prior Publication Data

US 2017/0208138 A1 Jul. 20, 2017

(51) Int. Cl.
*G06F 15/177* (2006.01)
*H04L 29/08* (2006.01)
*H04L 29/12* (2006.01)
*H04L 12/24* (2006.01)

(52) U.S. Cl.
CPC .......... *H04L 67/16* (2013.01); *H04L 41/0806* (2013.01); *H04L 41/22* (2013.01); *H04L 61/1511* (2013.01)

(58) Field of Classification Search
CPC ...... H04L 41/0806; H04L 67/16; H04L 41/22

USPC ........................................................ 709/222
See application file for complete search history.

(56) References Cited

U.S. PATENT DOCUMENTS

2009/0187970 A1* 7/2009 Mower ................. H04L 67/025
726/3
2014/0047342 A1* 2/2014 Breternitz ............. G06F 9/5061
715/735

OTHER PUBLICATIONS

Containers and Clusters for Edge Cloud Architectures—a Technology Review PAHL (Year: 2015).*

* cited by examiner

*Primary Examiner* — Atta Khan
(74) *Attorney, Agent, or Firm* — Hewlett Packard Enterprise Patent Department

(57) ABSTRACT

Systems, methods, and software described herein enhance the generation of large-scale processing framework clusters and corresponding edge services. In one implementation, a method includes identifying a request for a large-scale processing cluster, and identifying one or more edge services based on the type and version of the large-scale processing cluster. The method further provides generating a user interface that indicates the one or more edge services available, receiving a selection of at least one edge service in the one or more edge services, and initiating execution of the large-scale processing framework cluster and the at least one edge service, wherein the at least one edge service is provided with configuration information for the large-scale processing framework cluster.

16 Claims, 8 Drawing Sheets

ALLOCATING EDGE SERVICES WITH LARGE-SCALE PROCESSING FRAMEWORK CLUSTERS

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes.

In addition to the large-scale processing clusters that provide operations on the data, some computing environments may employ visualization and monitoring applications, or edge services, to more effectively render and interact with the operations of the processing cluster. These edge services, which may comprise Splunk, Hunk, Graylog, Platfora, or some other visualization and monitoring service, communicate with the large-scale processing framework nodes within the cluster and provide feedback to administrators and users associated with the cluster. However, although the edge services provide valuable information to the users and administrators associated with the large-scale processing clusters, it is often difficult and cumbersome to generate the necessary configuration information that permits the edge services to communicate with the large-scale processing cluster.

OVERVIEW

The technology disclosed herein provides enhancements for allocating edge services and large-scale processing clusters in a computing environment. In one implementation, a method includes identifying a request for a large-scale processing cluster, and identifying one or more edge services based on the type and version of the large-scale processing cluster. The method further provides generating a user interface that indicates the one or more edge services available, receiving a selection of at least one edge service in the one or more edge services, and initiating execution of the large-scale processing framework cluster and the at least one edge service, wherein the at least one edge service is provided with configuration information for the large-scale processing framework cluster.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
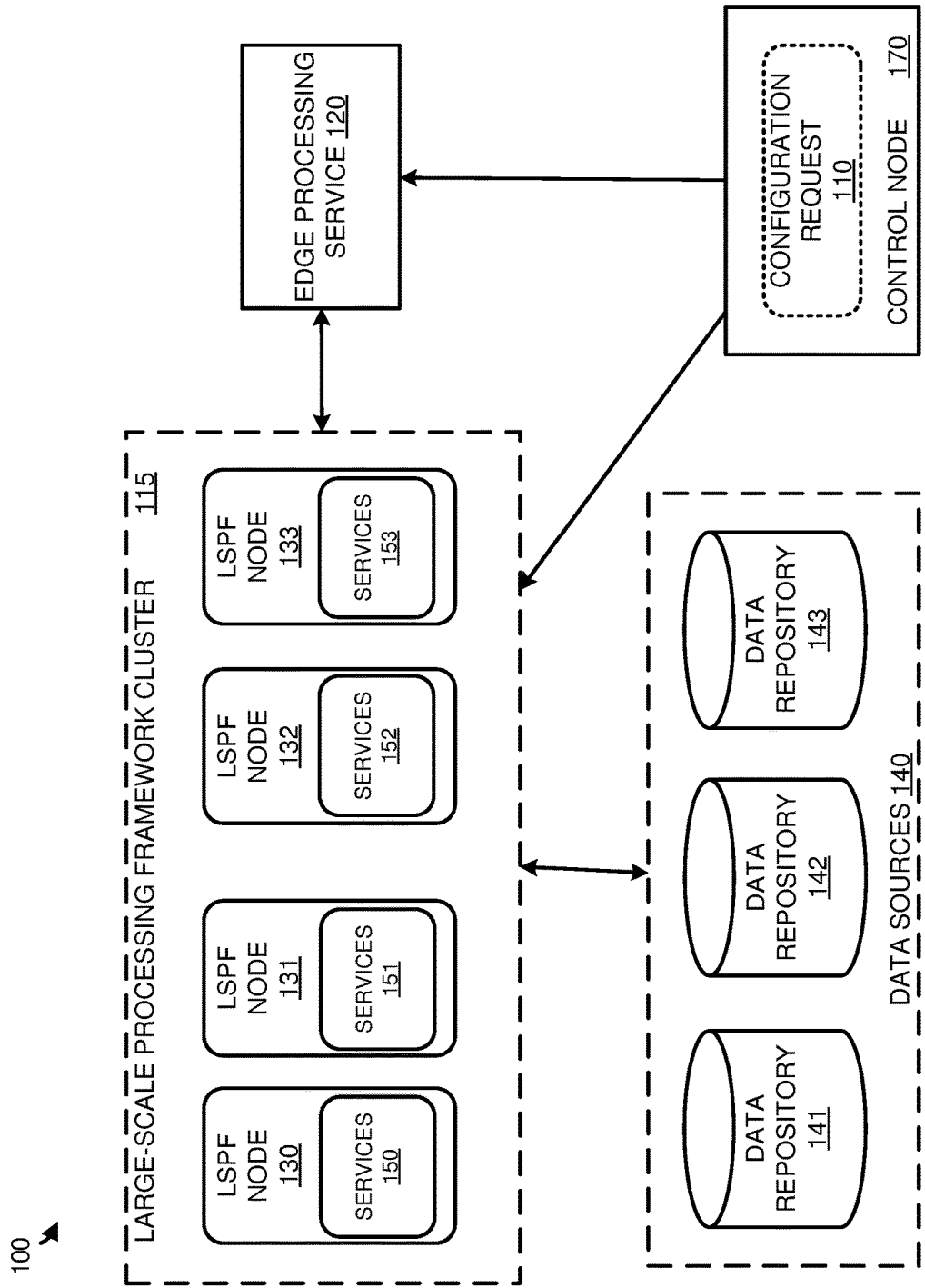
FIG. 1 illustrates a computing environment to execute large-scale processing framework clusters and edge processing services.

Large-scale processing environments (LSPEs) may employ a plurality of physical computing systems to provide efficient handling of job processes across a plurality of virtual data processing nodes. These virtual nodes may include full operating system virtual machines, Linux containers, Docker containers, jails, or other similar types of virtual containment nodes capable of executing large-scale processing frameworks (LSPFs). In addition to the virtual processing nodes, data sources are made available to the virtual processing nodes that may be stored on the same physical computing systems or on separate physical computing systems and devices. These data sources may be stored using versions of the Hadoop distributed file system (HDFS), versions of the Google file system, versions of the Gluster file system (GlusterFS), or any other distributed file system version—including combinations thereof. Data sources may also be stored using object storage systems such as Swift.

To assign job processes, such as Apache Hadoop processes, Apache Spark processes, Disco processes, or other similar LSPF job processes to the host computing systems within a LSPE, a control node may be maintained that can distribute jobs within the environment for multiple tenants. A tenant may include, but is not limited to, a company using the LSPE, a division of a company using the LSPE, or some other defined user group of the LSPE. In some implementations, LSPEs may comprise private serving computing systems, operating for a particular organization. However, in other implementations, in addition to or in place of the private serving computing systems, an organization may employ a cloud environment, such as Amazon Elastic Compute Cloud (Amazon EC2), Microsoft Azure, Rackspace cloud services, or some other cloud environment, which can provide on demand virtual computing resources to the organization. Within each of the virtual computing resources, or virtual machines, provided by the cloud environments, one or more virtual nodes may be instantiated that provide a platform for the large-scale data processing. These nodes may include containers or full operating system virtual machines that operate via the virtual computing resources. Accordingly, in addition to physical host machines, in some implementations, virtual host machines may be used to provide a host platform for the LSPF nodes.

In some implementations, in addition to the LSPF clusters within a computing environment, edge services and nodes may be required to generate end user views and manage the data being processed within the LSPF cluster. These edge services may include Splunk, Hunk, Platfora, Graylog, or some other similar edge service that interact with the data being processed in the LSPF cluster. For example, when a LSPF cluster is generated that executes a particular version of the Hadoop processing framework, a user may also be required to identify the appropriate edge service that can be used to generate a visualization of the data that is being processed by the Hadoop processing framework.

In the present implementation, to efficiently generate and allocate computing resources to the LSPF clusters and the edge services, the control node may be configured to provide selectable options to an administrator or user of the LSPE. In particular, the control node may present a first user interface to the administrator or user, indicating various types and versions of LSPFs that can be implemented within the computing environment. Once a LSPF is selected, the control node may determine edge services that correspond to the selected LSPF type and version. For example, if the administrator selected a Hadoop version 2.6, then the control node would identify all edge service types and versions that could interact with the particular Hadoop version. In some examples, the edge services that are capable of being provided with the LSPF clusters may comprise images of services, wherein the images include functions capable of interacting with the processing nodes within the cluster. For instance, functions within the image may include addressing functions to identify and communicate with the various nodes within the cluster, including masters, slaves, or any other node within the cluster.

FIG. 1 illustrates a computing environment 100 to execute LSPF clusters and edge processing services according to one implementation. Computing environment 100 includes LSPF cluster 115, edge processing service 120, data sources 140, and control node 170. LSPF cluster 115 further includes LSPF nodes 130-133, which are representative of LSPF nodes providing services 150-153 for LSPF job processes assigned to the cluster. LSPF cluster 115 may execute via one or more computing systems, such as serving computing systems, desktop computing systems, and the like capable of providing a platform for the LSPF processes. LSPF nodes 130-133 may comprise full operating system virtual machines, but may also comprise containers, such as Linux or Docker containers. Data sources 141-143 may reside on hard disk drives, solid state drives, or other similar storage media capable of storing data for processing by LSPF cluster 115. Data sources 140 may reside on one or more serving computing systems, desktop computing systems, and the like capable of storing the information for processing. Although illustrated separate in the present example, it should be understood that data repositories 141-143 in data sources 140 may reside on the same physical computing system or systems as LSPF cluster 115.

Edge processing service 120 may be initiated as at least one physical or virtual node on one or more computing systems within computing environment 100. Edge processing service 120 may reside on one or more physical computing systems, which may be separated or shared with LSPF cluster 115. Edge processing service 120 may comprise Splunk, Hunk, Platfora, or some other edge service capable of visualizing and managing job processes within LSPF cluster 115. In some examples, edge processing service 120 may be used to visualize and manage the data output of job processes within LSPF cluster 115.

Control node 170 comprises a physical or virtual node capable of generating processing clusters within computing environment 100, and attaching edge processing services to the generated clusters. Control node 170 may comprise physical computing systems, such as serving computing systems, desktop computing systems, laptop computing systems, tablet computing systems, and the like. Further, in some implementations, control node 170 may comprise a virtual machine or container capable of generating an interface to initiate LSPF clusters and corresponding edge services.

In the present implementation, control node 170 identifies configuration request 110 to generate LSPF cluster 115 within computing environment 100. In some implementations, configuration request 110 may comprise a cluster request from an administrator or user associated with a tenant of the computing environment. This tenant may comprise a division of an overall organization, an organization within a group of organizations, or any other similar division of groups capable of allocating clusters within computing environment 100. Once a request is generated for a new cluster, which may include specifying the type and version of the cluster, the amount of resources allocated to the cluster, the number of nodes in the cluster, the data repository for the cluster, and the like, control node 170 may determine edge processing services capable of being provided alongside the LSPF cluster. In some implementations, these edge services may be associated with the tenant. For example, if the tenant were associated with a license for Splunk, Splunk may appear as a selectable option for the administrator to add the service to a generated node.

Once the user selects a LSPF cluster configuration and an edge processing service to be introduced in computing environment 100, control node 170 may initiate an operation to start LSPE framework cluster 115 and edge processing service 120. This initiate operation may include allocating processing resources to the nodes of the cluster, allocating cache space for data in the LSPF cluster, providing addressing information to edge processing service 120, providing credentials to access the nodes of the cluster to edge processing service 120, or any other similar operation.

Figure 2:
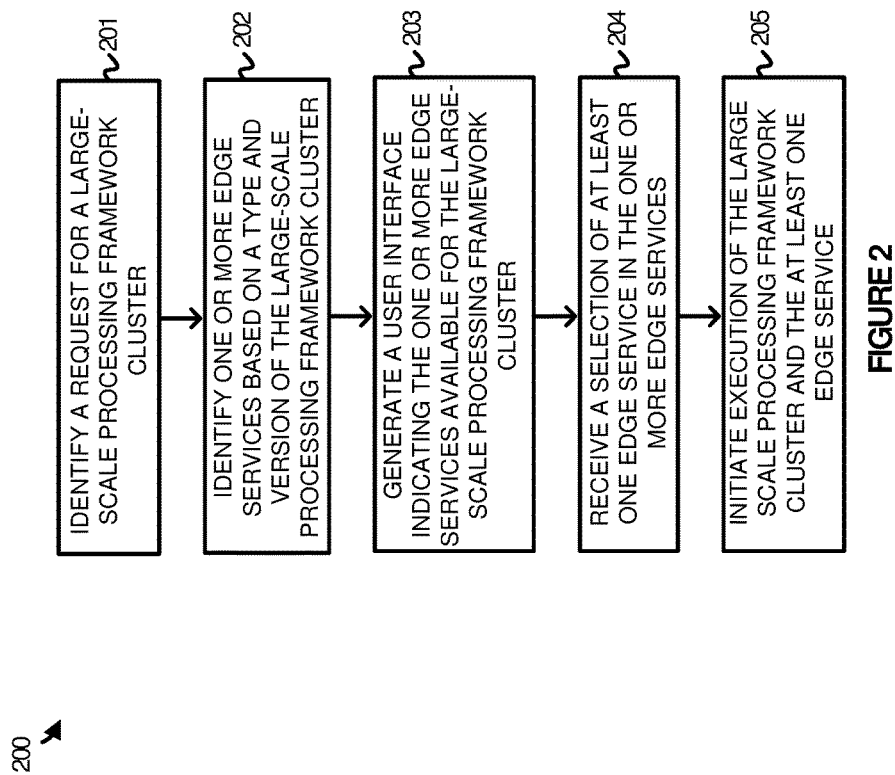
FIG. 2 illustrates a method of initiating large-scale processing framework clusters and edge processing services in a computing environment according to one implementation.

To further demonstrate the allocation of clusters and edge services in a computing environment, FIG. 2 is provided. FIG. 2 illustrates a method 200 of initiating LSPF clusters and edge processing services in a computing environment according to one implementation. The operations of FIG. 2 are described in the paragraphs that follow with reference to systems and objects of computing environment 100 from FIG. 1.

In particular, control node 170 identifies configuration request 110 from an administrator or user associated with a tenant of computing environment 100 (201). In some implementations, control node 170 may provide a user interface that permits the administrator or user to select configuration parameters for large-scale processing framework cluster 115. These parameters may include the type and version of the processing cluster, the amount of processing resources for the cluster, the amount of cache memory allocated to the cluster, the data repository to be used with the cluster, or any other similar information for the cluster. In some implementations, the user interface may be provided on the same computing system as control node 170, however, in other implementations, the user interface may be provided to the tenant administrator or user via a web browser, an interface application, or some other similar method at a remote console device.

Once the request is identified for the new processing clusters, control node 170 identifies one or more edge services for the cluster based on a type and version of the LSPF cluster (202). In many implementations, an administrator may possess access to a variety of different LSPFs including, but not limited to, Hadoop, Spark, and Disco frameworks, which may further comprise various versions or iterations. Based on the type and version of the framework selected by the user for the cluster, control node 170 may identify edge services that can be applied to the LSPF cluster. Once the edge services are identified, control node 170 generates a user interface indicating the one or more edge services available for the LSPF cluster (203), and provides the user interface to the administrator or user generating the cluster.

After the user interface is generated and provided to the administrator or user, control node 170 receives a selection of at least one edge service in the one or more edge services (204). For example, the user may be provided with possible edge services including Splunk, Graylog, or some other end service that can manage and visualize the data processed by the LSPF cluster. From the available services, the user may select an edge service, and once selected, control node 170 may initiate execution of the LSPF cluster and the at least one edge service, wherein the edge service is provided with configuration information for the LSPF cluster (205).

In the illustrated example of FIG. 1, in response to configuration request 110, control node 170 initiates LSPF nodes 130-133 and edge processing service 120. LSPF nodes 130-133 and edge processing service 120 may be initiated on one or more host computing systems capable of providing a platform for the data processing. These host computing systems may comprise physical computing systems, or may comprise virtual machines capable of executing the LSPF nodes 130-133 and any nodes associated with edge processing service 120.

In some implementations, in configuring the cluster and the edge processing service, control node 170 may provide various attributes or configuration parameters of the LSPF cluster to edge processing service 120. These attributes may include addressing information for the LSPF nodes and services within LSPF cluster 115, information about the type of data repository allocated to the particular cluster, addressing or path information for the data repository allocated to the cluster, or any other similar information. For example, the edge process may be provided with IP addresses for nodes in the cluster, and data path information for the storage repository associated with the cluster. Further, in some examples, LSPF cluster 115 may rely on LSPF cooperation services that assist in providing various operations to the cluster. These cooperation services may include a domain name system (DNS) service, a data retrieval service or layer, or some other similar cooperation service to assist in the operation of the LSPF cluster.

In at least one implementation, control node 170 may generate a DNS that can be used in addressing the LSPF nodes of LSPF cluster 115. In particular, control node 170 may provide credentials and addressing information for the DNS to both the nodes of LSPF cluster 115 and edge processing service 120. Once provided with the credentials and addressing information, rather than providing the individual IP addresses for each of the nodes, the LSPF nodes and edge processing service 120 may be provided with namespace identifiers for the each of the nodes. For example, referring to the nodes of FIG. 1, a first node may be provided with a namespace identifier of MARKETING/LSPFnode_1, while a second node may be provided with a second namespace identifier of MARKETING/LSPF-node_2. Once provided with the namespace identifiers, LSPF nodes 130-133 or edge processing service 120 may query the DNS with a particular namespace identifier and be provided with the IP address associated with the LSPF node. By providing a DNS, IP addresses may be changed for nodes of the cluster without supplying the new IP addresses to the individual nodes and edge service.

In another example, in addition to or in place of the DNS service, LSPF cluster 115 may interact with a data retrieval layer that acts as an intermediary between the LSPF nodes of the processing cluster and the data repository associated with the processing cluster. This data retrieval layer may reside as a process on the host computing systems for LSPF nodes 130-133, and is configured to identify data requests, determine the data repository associated with the data requests, and access the data repository in a data access format associated with the particular repository. In some examples, LSPF nodes 130-133 may use a first access format that is different than the required access format for the data repository associated with the processing cluster. Consequently, when a data request is generated by a LSPF node of LSPF nodes 130-133, the data retrieval layer identifies the request in the first format, translates the request into the format required by the data repository, and accesses the data in accordance with the format required by the data repository. Once the data is accessed, the data retrieval layer may cache the data in locations of memory associated with the requesting LSPF node.

Although described above with respect to a data read request from a LSPF node, it should be understood that similar operations may be applied to write requests from the LSPF nodes. For example, when a LSPF node requires a write to the data repository, the data retrieval layer may identify a write request using the first access format, translate the write request into the format for the repository, and store the data associated with the write to the data repository using the format required by the data repository.

In some implementations, the edge processing services that are made available for selection by the administrators and user may comprise images that include functions capable of interacting with the nodes and services within LSPE cluster 115. For example, referring to the data retrieval layer example from above, edge processing service 120 may include one or more functions capable of using the data retrieval layer to monitor and access data repositories used by the LSPF nodes. Consequently, in addition to providing configuration information about the processing nodes, such as addressing and credential information, control node 170 may further provide any additional configuration information for the cooperation services for the LSPF cluster.

Figure 3:
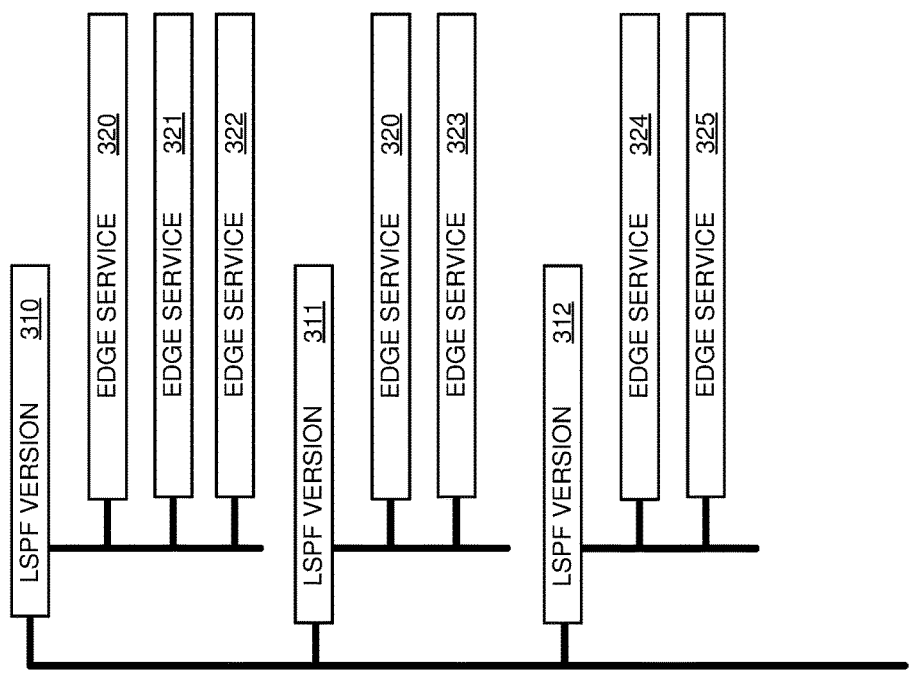
FIG. 3 illustrates a hierarchy for managing edge services and large-scale processing framework versions according to one implementation.

FIG. 3 illustrates a hierarchy 300 for managing edge services and large-scale processing framework versions according to one implementation. Hierarchy 300 includes LSPF versions 310-312 and edge services 320-325. Although illustrated with three LSPF versions and six different edge services in the present implementation, it should be understood that any number of LSPF versions and edge services may be provided as options for end users. Further, although illustrated as a tree in the present example, it should be understood that other data structures, such as arrays or linked lists, may be used to maintain information on the LSPF versions and edge services.

As described herein, LSPEs may include various computing systems capable of providing a host for tenant LSPF clusters. These clusters employ various frameworks including, but not limited to, Apache Hadoop, Apache Spark, and Disco frameworks. When a new request is generated for a cluster, a control node is configured to identify the request and determine edge services that can be used to monitor, manage, and visualize the data that is being processed by LSPF nodes. In the present example, to determine edge services capable of servicing each of the nodes, hierarchy 300 may be maintained by the control node to determine edge services associated with each LSPF version.

For example, if an administrator associated with a particular tenant selected LSPF version 311 for a particular cluster. The control node configured to generate the cluster, may use hierarchy 300 to identify edge services associated with LSPF version 311, and provide options of edge services 320 and 323 to the administrator. Once provided the administrator may select one or more of the edge services, permitting the edge services to be initiated alongside the LSPF processing nodes.

Although illustrated in the present implementation as LSPF versions, it should be understood that LSPF types may further be used to divide the hierarchy in hierarchy 300. For example, the hierarchy may further be divided into various versions of Spark clusters, Hadoop clusters, or other similar clusters. Based on the selection of the type and version of the cluster, the edge services may be determined and provided to the administrator to determine which of the edge services should be provided with the selected cluster.

In some examples, each of the tenants of the processing environment may be provided with different sets of edge services. These sets of edge services may be determined based on selection by an administrator of each of the tenants, based on the assignment of edge services by an administrator of multiple tenants, based on permissions or licenses associated with each of the tenants, or any other similar assignment basis. For example, if the computing environment included a marketing tenant and finance tenant, the marketing tenant may select or be associated with different edge services than the finance tenant.

In some implementations, the edge services that are allocated within the hierarchy 300 may comprise special edge service images that can be implemented with the clusters. These images may include processes and functions that interact with the LSPF cluster and/or the control node to provide appropriate access and information to manage the cluster and the visualization of the data within the cluster. These functions may include addressing functions to identify the services and nodes within the cluster, functions to interact with data retrieval layer of the processing cluster, or any other similar function to provide the interactions with the data processing operations. To generate the images that can be used in conjunction with the LSPF cluster, developers may use a software development kit (SDK) to generate the functions to retrieve the necessary information from the control node. For example, the SDK may assist the developers in generating the functions that retrieve the addressing information, the storage locations, or any other similar information for the cluster. Further, in some examples, the SDK may be used to retrieve necessary credentials, such as usernames, passwords, tokens, and other similar credentials, permitting the edge service to access nodes and information within the LSPF cluster. In some instances, the images may be downloaded from a repository to be implemented within the computing environment by the control node, however, it should also be understood that the images may be locally developed by a user or administrator of the computing environment based on the requirements of the individual tenant or tenants.

In some implementations, to determine the available edge services for each LSPF version, an association mechanism or software module may be used to determine required attributes for each of the edge services to operate. For example, an edge service may require specific LSPF service types and versions, such as specific resource manager services, node manager services, master services, worker services, and other similar LSPF services to interact with the LSPF cluster. If a LSPF version includes the proper LSPF service types and versions required by an edge service, then the edge service may be associated with the LSPF version and provided as an option to be implemented alongside a cluster of that LSPF version. However, if a LSPF version does not include the proper LSPF service types and versions required by an edge service, then the edge service will not be associated with the LSPF version and will not be provided as an option to be implemented alongside a cluster of that LSPF version.

By providing an association mechanism, which may be implemented in the control node or some other computing system capable of associating the LSPF versions to edge service versions, developers may independently generate the LSPF cluster software and the edge service software. Once an edge service is generated, the association mechanism may determine required LSPF attributes for the edge service, and associate the edge service with one or more LSPF versions that contain the required attributes. For example, if an edge service required a particular master service type/version and a particular worker service type/version, the association mechanism may identify all LSPF versions capable of supporting the new edge service. Once identified, the edge service may be provided to users capable of generating new LSPF clusters within the processing environment.

In some implementations, a developer of a LSPF version or edge service may upload an image of the LSPF version or edge service to the control node or other similar management computing system associated with the LSPF environment. Once uploaded, attributes and attribute requirements may be identified within the image, and associations between the LSPF versions and edge services may be generated. Once the associations are generated and, in some examples, placed into a data structure such as hierarchy 300, the LSPF version or edge service may be selectable by a tenant/user of the processing environment using the control node.

Figure 4A:
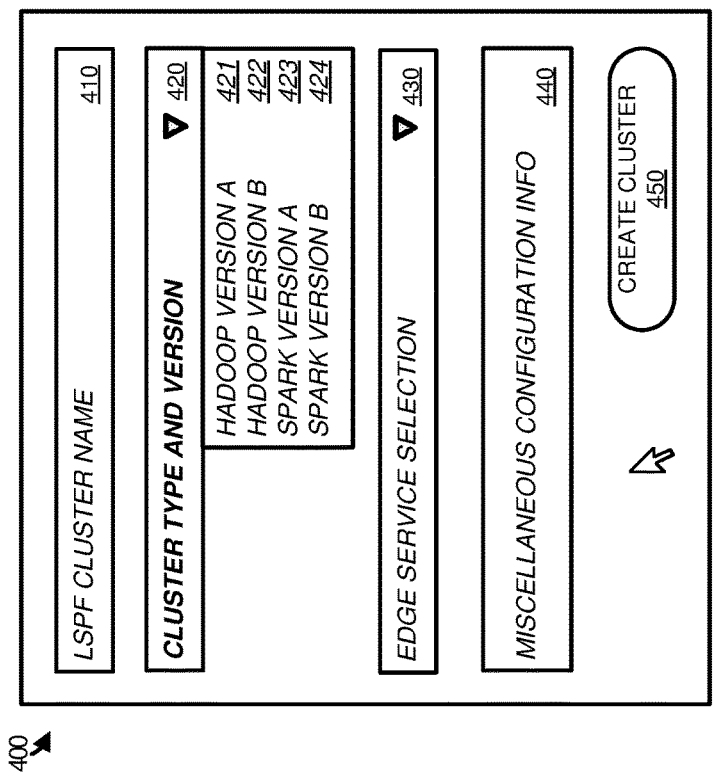
FIG. 4A illustrates a user interface for selecting cluster types and versions for a large-scale processing framework cluster according to one implementation.

FIG. 4A illustrates a user interface 400 for selecting cluster types and versions for a large-scale processing framework cluster according to one implementation. User interface 400 includes data entries for LSPF cluster name 410, cluster type and version 420, edge service selection 430, miscellaneous configuration information (info) 440, and create cluster 450.

In operation, a control node for a LSPE may be used to provide a centralized management system for tenants to generate and modify LSPF clusters within a LSPE. This control node may, when provided with credentials for a particular tenant, permit the user associated with the tenant to make modifications and create new processing clusters within the environment. In the present example, to generate a new cluster, the control node generates user interface 400, which provides various options for the end user in the generation of the new cluster. These options include the LSPF cluster name 410, the cluster type and version 420, the edge service selection 430 associated with the type of cluster, and other miscellaneous configuration information 440. This miscellaneous configuration information may include the amount of processing cores that are provided to the cluster, the amount of physical cache memory that can be used to cache data for the cluster, the data repository that is to be used with the cluster, or any other similar information.

Here, the user is provided with four cluster types and versions 420. These cluster types and versions include Hadoop version A 421, Hadoop version B 422, Spark version A 423, and Spark version B 424. Although illustrated as a drop down menu, it should be understood that the options to generate a cluster may be provided in any other manner including, but not limited to, a text box for entry of the cluster type or check boxes for selecting the cluster type. Once the cluster type is selected by the end user, edge service selection 430 may be modified in accordance with the selection. In particular, edge service selection 430 may provide the end user with edge services that are available for the cluster based on the cluster type and version 420 selected by the end user. For example, if the user selected Hadoop version A 421, the user may be provided with a different subset of edge services than if the user were to select Spark version A 423.

Figure 4B:
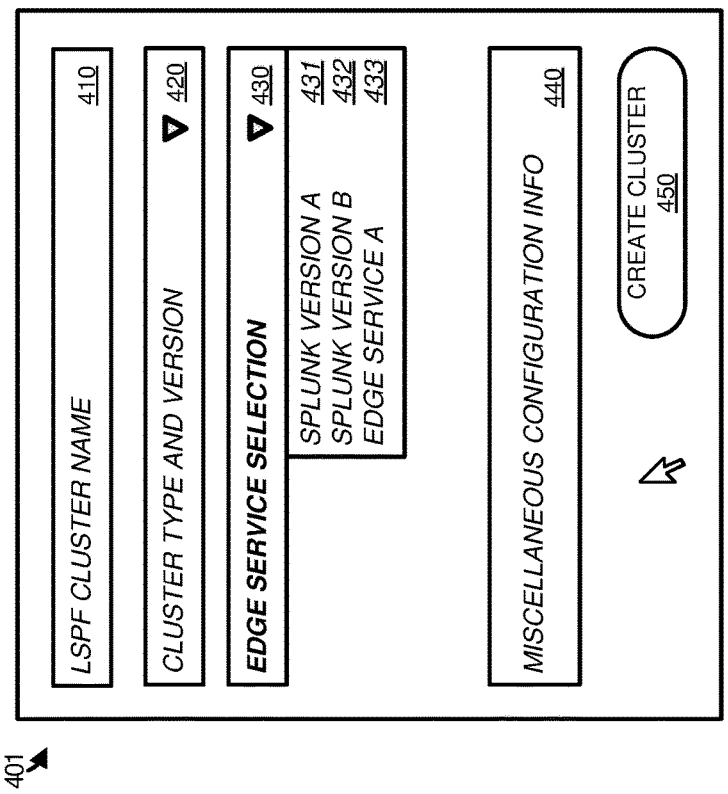
FIG. 4B illustrates a user interface for selecting edge services based on a type and version of a selected large-scale processing framework cluster according to one implementation.

Referring to FIG. 4B, FIG. 4B illustrates a user interface 401 for selecting edge services based on a type and version of a selected large-scale processing framework cluster according to one implementation. User interface 401 is an example user interface presented to a user after the user selects a cluster type and version 420 from user interface 400.

In the present example, once a user selects a cluster from cluster type and version 420, the user may select an edge service from edge service selection 430, wherein edge service selection 430 provides services that are capable, and configured to, communicate with the type of cluster selected by the user in user interface 400. Here, the user is presented with Splunk version A 431, Splunk version B 432, and edge service A 433. From these available selections, the user may select at least one edge service to be deployed alongside the cluster when the user initiates the cluster using create cluster 450.

In many implementations, the various services that are provided to the user comprise software images with functions capable of configuring one or more edge service nodes to interact with a particular cluster. These images may include the monitoring and visualization functions for the nodes to generate the visual representations of the data being processed within the cluster, may include metadata information of what types of clusters are supported by the application, may include functions to initiate the start up of the edge nodes, or may comprise various other functions to execute the edge nodes alongside the LSPF cluster in the processing environment. For example, a developer may generate an edge process image that can be used with all Spark clusters generated for the computing environment. This edge process image would include the the Spark functions to visualize and monitor the data used in the cluster, the start up functions to gather addressing and other configuration information for the nodes and storage repositories, and other similar functions permitting the edge service to be generated alongside the processing nodes.

In some examples, the edge process image may also include functions and processes to interact with a data retrieval layer associated with the data processing nodes. This data retrieval layer acts as an intermediary capable of identifying data access requests (both read and write) in a first access format, identifying a data repository associated with the request, translating the request, if necessary, into a second data access format, and accessing the repository in accordance with the data access request. In the present implementation, to monitor the data of the data repository, functions (or processes) within the edge processing node images may be provided with access to the data retrieval layer to monitor the data as it is requested and transferred for the processing nodes.

Figure 5:
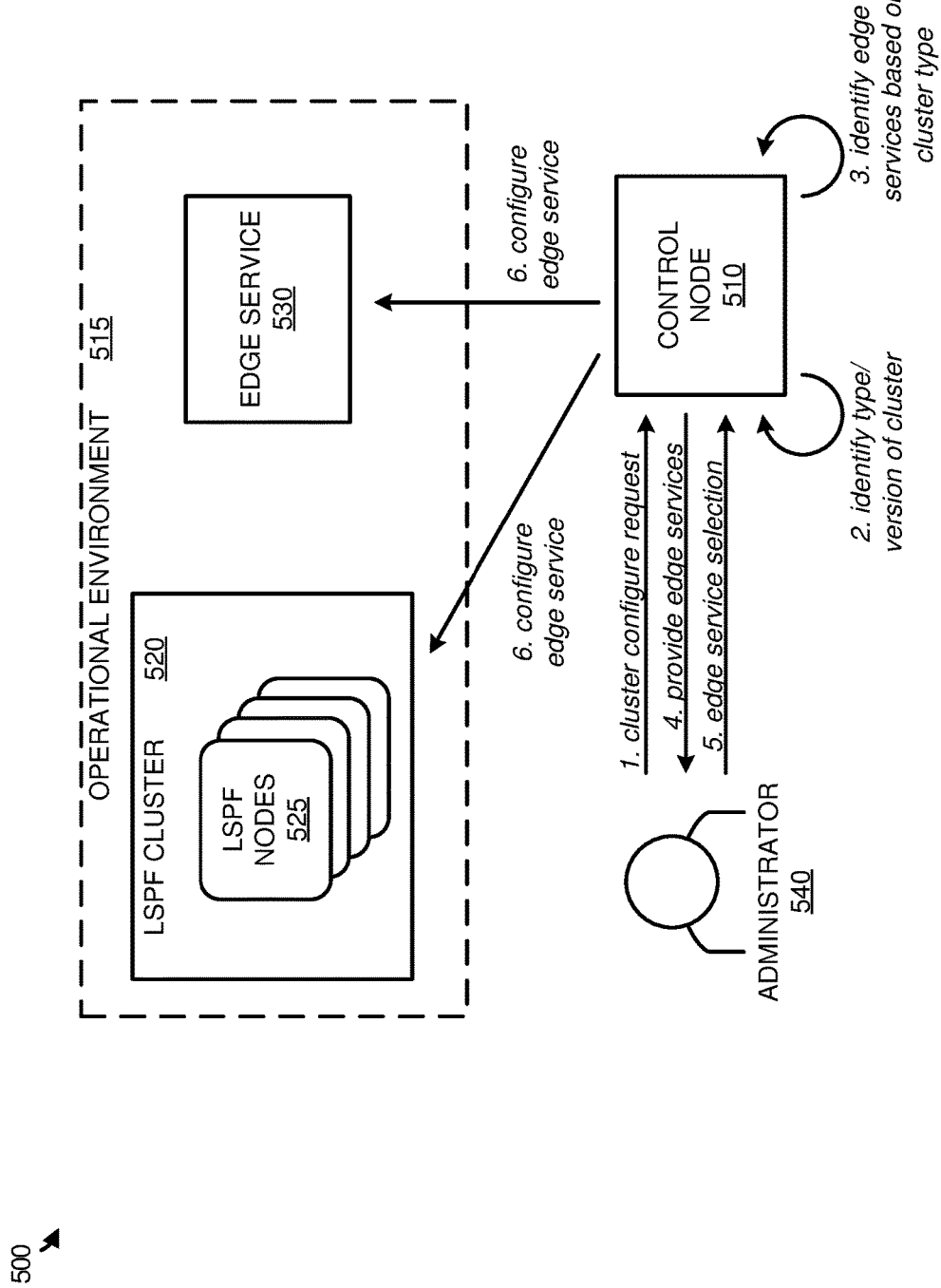
FIG. 5 illustrates an operational scenario of identifying and initiating a large-scale processing framework cluster and edge service according to one implementation.

FIG. 5 illustrates an operational scenario 500 of identifying and initiating a large-scale processing framework cluster and edge service according to one implementation. Operational scenario 500 includes operational environment 515, control node 510, and administrator 540. Operational environment 515 further includes LSPF cluster 520 with LSPF nodes 525, and edge service 530. Although illustrated with a single LSPF cluster in the present implementation, it should be understood that any number of LSPF clusters may be initiated on computing systems in operational environment 515. Further, while demonstrated as an administrator in the present example, it should be understood that administrator 540 may comprise a user or any other personnel or tenant member capable of generating a new cluster in operational environment 515.

In the present example, at step 1, administrator 540 generates a cluster configuration request, wherein the request may specify a type and version of the LSPF cluster that administrator 540 desires within operational environment 515. In some implementations, the user interface for the administrator to generate the request may be displayed on the same computing system as control node 510. However, in other implementations, the user interface may be provided to administrator 540 at a remote console or device. This providing of the user interface may be done using a web browser, a specific application on the console device, or by some other similar method on the console device. Although not depicted in operational scenario 500, in some examples, administrator 540 may be associated with a particular tenant of a plurality of tenants capable of generating and modifying clusters within operational environment 515. These tenants may comprise different organizations sharing computing resources, divisions of one or more organizations sharing computing resources, or some other similar tenant structure within a computing environment.

Once control node 510 receives the cluster configuration request from administrator 510, control node 510, at step 2, identifies the type and version of the cluster specified by administrator 540. Once the type and version are identified, control node 510, at step 3, identifies edge services for the cluster based at least on the cluster type and version. For example, a Hadoop cluster of a first version may have different available edge processes than a Hadoop cluster of a second version. In some implementations, in addition to identifying the edge services that are available to the cluster based on the type and version of the LSPF to be used in the cluster, control node 510 may further separate the available edge services based on the tenant that is requesting the new LSPF cluster. For example, when a computing environment is capable of hosting clusters for multiple tenants, each of the tenants may have licenses to various versions of edge processing software. Consequently, one edge service that would be provided to a first tenant might not be applicable to another tenant. As a result, control node 510 may maintain information about the edge services that are required by each of the tenants and provide access to the services associated with each of the tenants.

After the identification of the edge services to support the cluster configuration request, control node 510, at step 4, provides the available edge services to the administrator, permitting the administrator to select at least one edge service for the cluster. This providing of the edge services may appear on a local interface to the computing system or control node 510, or may be provided to a display on the device. Once the available edge services are provided to administrator 540, administrator 540 may select at least one of the edge services, wherein the edge service selection is identified by control node 510, at step 5. Based on the selection of administrator 540, at step 6, control node 510 may initiate and configure LSPF cluster 520 and edge service 530 to provide the desired operations of the administrator.

As described herein, the edge services that are provided alongside the LSPF clusters within the operational environment require a variety of information to communicate with the LSPF nodes that make up the cluster. This information may include addressing information for each of the nodes that make up the cluster, addressing information for the services located on each of the processing nodes, credential information (passwords, usernames, tokens), or any other similar addressing information. In some implementations, when the user selects to generate a cluster, control node 510 may generate a DNS and other addressing services that can be used to identify the IP addresses associated with LSPF nodes. Consequently, in some examples, edge service 530 may be provided with addressing information and credentials for the DNS, which in turn can be used to identify the appropriate IP addresses associated with the individual LSPF nodes in LSPF cluster 520.

Further, in some examples, LSPF cluster 520 may employ a data retrieval layer that acts as an intermediary between the nodes of the LSPF cluster and the data repository of the cluster. This data retrieval layer is configured to translate requests from the LSPF nodes into the appropriate access format required for the nodes. For example, if the nodes address the data using HDFS when using the Hadoop framework, but the data repository comprises a GlusterFS repository, then the data retrieval layer may convert data access requests from the HDFS format to the GluserFS format as required to access the repository. Similarly, if the edge service is required to access or monitor the data repository for the LSPF cluster, control node 510 may configure the data retrieval layer and/or the edge service to communicate with the data repository using the similar operations as the LSPF nodes with the data retrieval layer.

Figure 6:
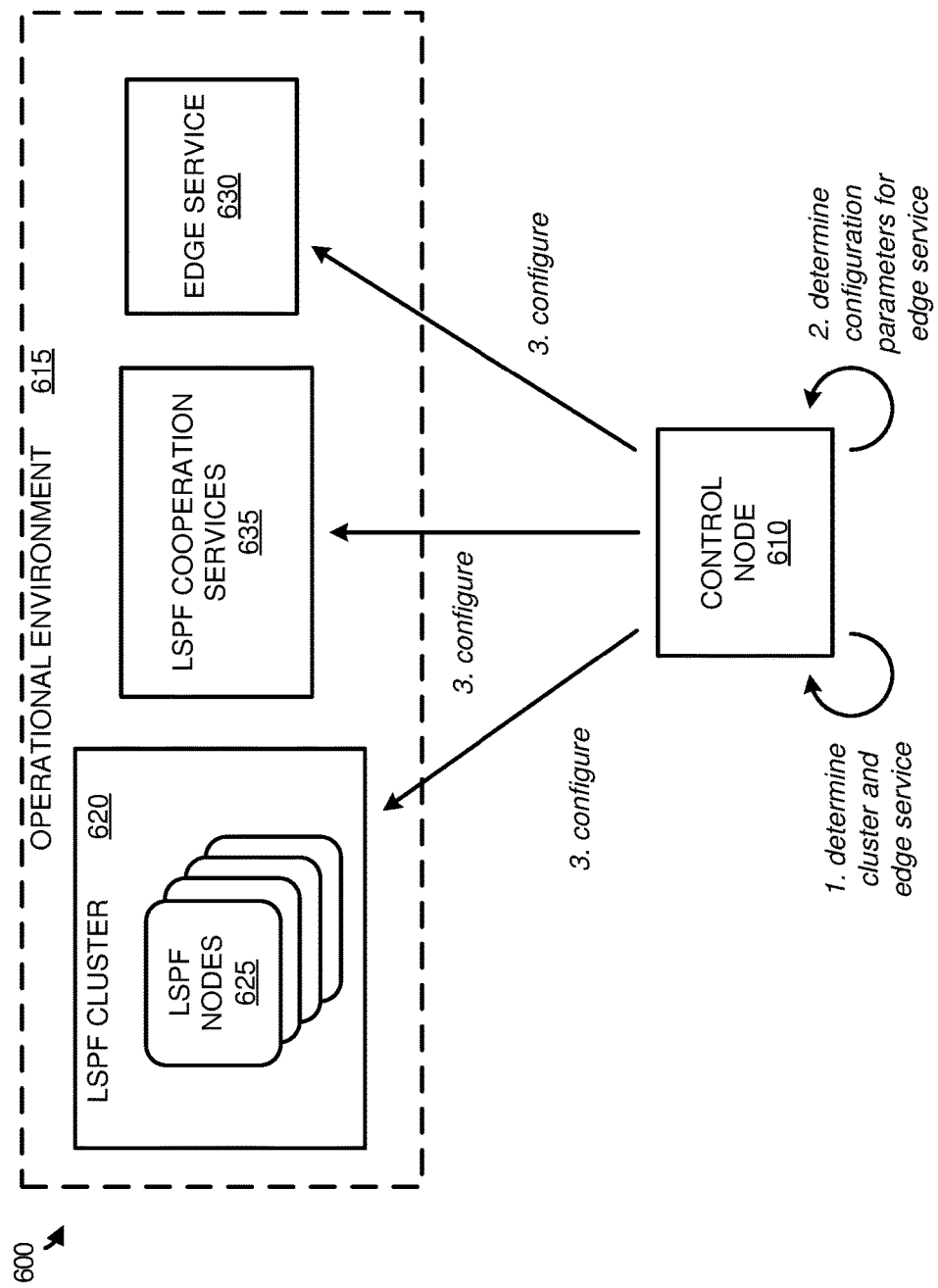
FIG. 6 illustrates an operational scenario of configuring a large-scale processing framework cluster and edge service according to one implementation.

FIG. 6 illustrates an operational scenario 600 of configuring a large-scale processing framework cluster and edge service according to one implementation. Operational scenario 600 includes operational environment 615 and control node 610. Operational environment 615 further includes LSPF cluster 620 with LSPF nodes 625, LSPF cooperation services 635 and edge service 630. LSPF cooperation service 635 may comprise a DNS configured to assist in the addressing of the LSPF nodes, may comprise a data retrieval layer capable of assisting in the retrieval of data from data repositories associated with LSPF cluster 620, or may comprise other similar services that assist the operation of LSPF cluster 620, including combinations thereof. LSPF cooperation services 635 may execute on the same computing systems as LSPF nodes 625, or may execute on separate computing systems within operational environment 615.

In operation, users associated with a tenant of operational environment 615 may provide a request to generate a LSPF cluster using a plurality of LSPF nodes. Once the request is generated, based on a type and version of the LSPF cluster requested, the user may also select an edge service that can be used to visualize and monitor the operations of the LSPF cluster. In the present example, control node 610, at step 1, determines the cluster and edge service to be generated for a requesting and user. Once determined, to initiate the cluster and edge service within the environment, control node 610, at step 2, determines configuration parameters for the edge service before configuring the LSPF cluster and edge service in operational environment 615. These configuration parameters may include addressing information for LSPF nodes 625 in LSPF cluster 620, may comprise storage repository addressing information for the storage repository associated with LSPF cluster 620, may comprise credentials to access each of the nodes within the cluster, or may comprise any other similar configuration parameter, including combinations thereof.

In some implementations, LSPF nodes 625 may use a DNS to address the other nodes within LSPF cluster 620. This DNS, which may reside as part of cooperation services 635, may permit the nodes to provide the DNS with a namespace identifier for a particular node, and receive an internet protocol (IP) address associated with the particular node. For example, if the tenant for cluster 620 were a marketing tenant, a first node in LSPF nodes 625 may transfer a request to the DNS indicating an address request for a second node in LSPF nodes 625. This request would include a namespace identifier for the second node, such as MARKETING.NODE_2 or some other namespace identifier associated with the second node. Accordingly, rather than configuring the nodes with the IP addresses for the other nodes of the cluster, the LSPF nodes may be configured with addressing information for the DNS (and any necessary credentials associated therewith) and namespace identifiers for the individual nodes that can be translated by the DNS into IP addresses. Similarly, control node 610 may provide DNS information to edge service 630, permitting edge service 630 to use the DNS in addressing the individual nodes and the services located thereon. By providing a DNS, IP addresses may be changed for each of the LSPF nodes, and only requiring a change to the DNS configuration to reflect the IP address changes.

Further, in addition to or in place of the DNS service, LSPF cluster 620 may use a data retrieval layer or service that acts as an intermediary between the nodes of the cluster and the data repository for the cluster. In particular, the data retrieval layer may identify data write and read requests to the storage repository using a first access format, translate the requests if necessary into a second access format associated with the data repository, and perform the write or read operation. In some implementations, the data retrieval layer may be associated with cache memory or physical memory that is allocated to the LSPF nodes to cache data during data processing. Consequently, the data retrieval layer or service may be responsible for writing to and reading from the cache memory allocated to the individual nodes. Additionally, when edge service 630 is provided alongside the LSPF cluster, control node 610 may provide addressing information for the storage repository to edge service 630. This addressing information may permit edge service 630 to use a first access format in communicating with the storage repository, which in turn will be translated into a second access format if necessary to access the required data repository. Thus, the data retrieval layer may act as a data connector between the requesting processes and the data repository. For example, if LSPF cluster 620 and edge service 630 used an arbitrary file access format to access data in a storage repository, then the data retrieval layer will act as an intermediary that translates the arbitrary file access format into the format required by the data storage repository.

Once the configuration parameters are determined for the edge service and the LSPF cluster, control node 610 configures, as part of the initiation process at step 3, LSPF cluster 620, LSPF cooperation service 635, and edge service 630 with the appropriate configuration parameters. In some implementations, edge service 630 and the other edge services available for LSPF clusters in operational environment 615 may comprise images configured to be deployed alongside the particular clusters. These images may contain the functions or processes that provide the edge service operations, and may further include functions or processes that, in combination with control node 610, gather necessary configuration information for the cluster. This gathering of the configuration information may include gathering addressing information for the cluster, gathering addressing information for services in the cluster, gathering addressing information for the storage repository associated with the cluster, or any other similar information related to the configuration of LSPF cluster 620. Further, the image may also contain functions and processes capable of interacting with LSPF cooperation services 635, such as a DNS, or the data retrieval layer. These functions may include addressing information for the DNS, interaction functions to use a data retrieval layer to monitor data to and from a storage repository, or any other similar function.

After LSPF cluster 620, LSPF cooperation services 635, and edge service 630 are configured, job processes may be allocated to the cluster to provide operations on the desired data set. During the execution of the job processes, which may comprise Apache Hadoop, Apache Spark, Disco, and other similar job processes, edge service 630 may monitor and generate visualizations of the data to be presented to administrators/users associated with the particular tenant. These visualizations may include graphs, tables, data readouts or quantifiers, or any other similar visualization of the data. Further, in some implementations, edge service 630 may select specific data to be processed by LSPF nodes 625, such as data from social media networks, personnel information, or some other data stored in a data repository linked to the cluster.

Figure 7:
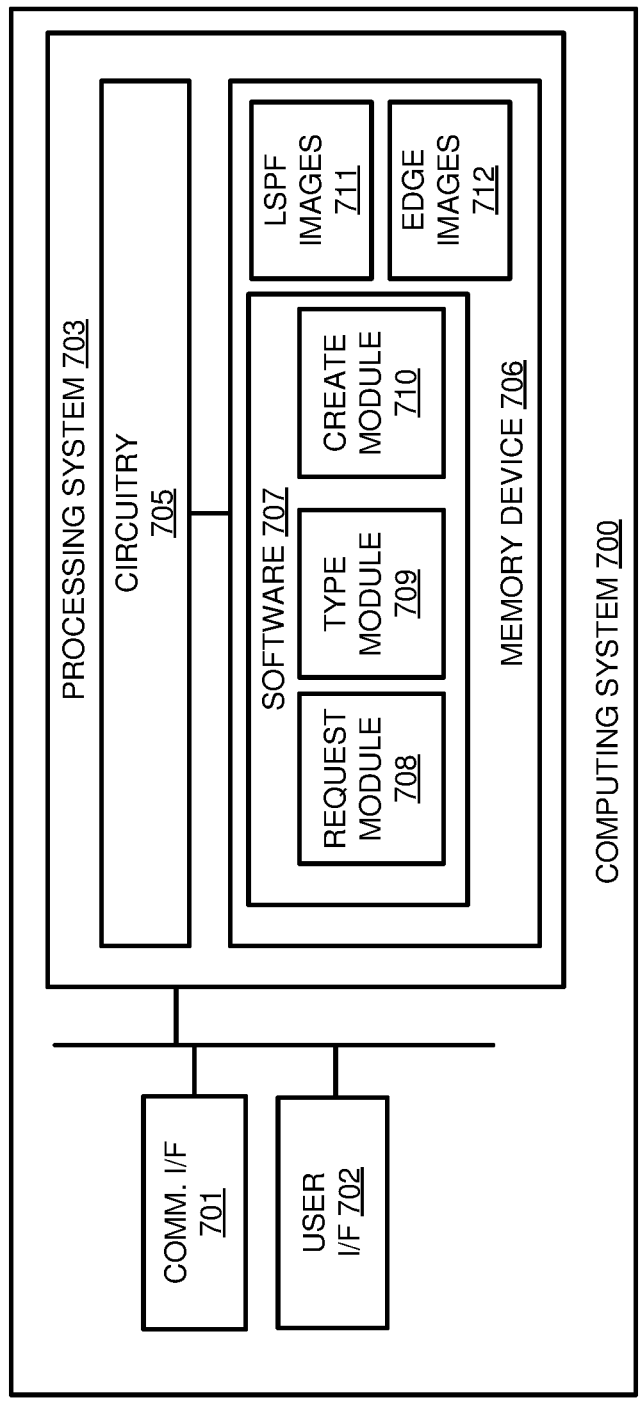
FIG. 7 illustrates a computing system to initiate large-scale processing framework clusters and edge services according to one implementation.

FIG. 7 illustrates a computing system 700 to initiate large-scale processing framework clusters and edge services according to one implementation. Computing system 700 is representative of any computing system or systems with which the various operational architectures, processes, scenarios, and sequences disclosed herein for a large-scale processing computing environment may employed. Control node computing system 700 is an example of computing environment 100 from FIG. 1, and the computing environments depicted in operational scenarios 600 and 700 from FIGS. 6 and 7, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as batteries and enclosures that are not shown for clarity. Computing system 700 may comprise one or more servers, personal computers, routers, or some other computing apparatus, including combinations thereof.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Memory device 706 includes LSPF images 711 corresponding to LSPF images that can be deployed as a cluster by computing system 700, and edge images 712 that can be deployed alongside the LSPF clusters in one or more processing nodes to provide visualization and monitoring operations for the clusters deployed by computing system 700. Operating software 707 comprises computer programs, firmware, or some other form of machine-readable processing instructions. Operating software 707 includes request module 708, type module 709, and create module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one example, computing system 700 may provide operations in accordance with control nodes 170, 510, and 610 from FIGS. 1, 5, and 6. In particular, request module 708 directs processing system 703 to receive a request for a new LSPF cluster from a user associated with a tenant of the computing system. This request may include a name for the new cluster, a definition of the type and version of the cluster required, a number processing and memory resources that should allocated to the cluster, or any other similar configuration requirements for the new LSPF cluster. In response to the request, type module 709 directs processing system 703 to determine a type and version of the LSPF cluster, wherein the type and version are used to identify edge services that are available for the type of cluster. For example, if the user selected a version of the Hadoop framework for a LSPF cluster, then computing system 700 may identify that the edge service Hunk could be provided to support the visualization and monitoring of the processing cluster.

Once the edge services are determined for the processing cluster, type module 709 may provide the available services to the end user, permitting the user to select one or more services to be deployed alongside the LSPF cluster. In some implementations, in addition to considering the type and version of the LSPF cluster, type module 709 may also determine edge services that are available based on the identity of the tenant. For example, some edge services may require credentials, including a subscription, a license key, or some other credentials to make the license available to a LSPF cluster. Consequently, when the user for a tenant requests a cluster, type module 709 may determine any available edge images in edge images 712 that can be provided to the user.

Once an edge service is selected from available edge images 712 and a LSPF image is selected from LSPF images 711, create module 710 initiates execution of the desired LSPF cluster and edge service on one or more computing systems. This initiation may include allocating processing resources on physical or virtual host computing systems, generating virtual machines or containers capable of hosting the LSPF and the edge service, and providing the necessary information to the edge service, permitting the edge service to communicate with the plurality of LSPF nodes. Further, in some examples, once the edge service is selected for the LSPF cluster, the user may be required to provide credentials, such as a username and password combination, a registration key, or some other credential to initiate the edge service in the computing environment.

In some implementations, create module 710 may be configured to identify configuration parameters for the LSPF nodes and provide the parameters to the initiated edge service. This information may include addressing information for the LSPF nodes, addressing information for the services of the LSPF nodes, addressing information for the storage repository associated with the cluster, or any other similar information. To retrieve the information, edge images 712 may include functions that query the control node generating the LSPF cluster for the information, or the control node may, using preconfigured processing instructions, automatically provide necessary configuration information to the edge nodes.

In some examples, in addition to the configuration information for the LSPF cluster, the edge service may also be provided with information about cooperation processes that are used by the LSPF cluster. These cooperation processes may include, but are not limited to, DNS services provided to the cluster and data retrieval layer processes. In particular, rather than configuring each of the nodes of the cluster with IP addresses for the other nodes within the same cluster, a DNS may be used by the cluster nodes to determine addressing information for the other nodes. This DNS permits the nodes to use a namespace associated with the tenant to address each of the nodes. For example, if the tenant were the legal department of a corporation, computing system 700 might provide namespace identifiers to each of the nodes of the legal department cluster, such as LEGAL.node_1. The namespace identifiers may then be provided to the nodes of the cluster, permitting the nodes of the cluster to query the DNS for IP addressing information for the other nodes. Further, if the cluster is migrated or initiated with alternative IP addresses, rather than reconfiguring each of the nodes with the new IP addresses, the DNS may be modified to reflect the IP address changes for the computing cluster. Additionally, any edge services associated with the cluster may be provided with the IP address of the DNS, permitting the edge services to determine the IP addressing information for the LSPF cluster. In some examples, in providing the IP address of the DNS, create module 710 may also provide permissions or credentials that permit the edge services to communicate with the DNS. These credentials may include usernames, passwords, access keys, or any other similar permissions.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a control node of a large-scale data processing environment, the method comprising:
   identifying a request for a large-scale processing framework cluster;
   determining a type and version of the large-scale processing framework cluster;
   identifying one or more edge services capable of interacting with the large-scale processing framework cluster based on the type and version of the large-scale processing framework cluster;
   generating a user interface that indicates the one or more edge services available for the large-scale processing framework cluster;
   receiving a selection of at least one edge service in the one or more edge services; and
   initiating execution of the large-scale processing framework cluster as one or more virtual nodes and the at least one edge service as one or more additional virtual nodes, wherein the at least one edge service comprises configuration functions that obtain configuration information for the large-scale processing framework cluster, wherein the configuration information comprises addressing information to communicate with the large-scale processing framework cluster, and wherein initiating the execution of the large-scale processing framework cluster and the at least one edge service comprises:
      executing the configuration functions to obtain the configuration information for the large-scale processing framework cluster; and
      allocating permissions to the at least one edge service to access the large-scale processing framework cluster.

2. The method of claim 1 wherein the large-scale processing framework cluster comprises one of an Apache Hadoop cluster or an Apache Spark cluster.

3. The method of claim 1 wherein the one or more edge services comprise at least one Splunk service.

4. The method of claim 1 wherein the one or more edge services comprise one or more edge service images.

5. The method of claim 1 wherein initiating execution of the large-scale processing framework cluster and the at least one edge service comprises:

generating a domain name system (DNS) for the large-scale processing cluster, wherein the DNS comprises addressing information for nodes in the large-scale processing cluster; and providing credentials and addressing information for the DNS to the large-scale processing framework cluster and the at least one edge service.

6. The method of claim 1 further comprising:

identifying a plurality of available large-scale processing framework types and versions available to process data for a tenant of a computing environment; and generating a first user interface that indicates the plurality of available large-scale processing framework types and versions, wherein identifying the request for the large-scale processing framework cluster comprises receiving a selection of a large-scale processing framework type and version from the plurality of available large-scale processing framework types and versions.

7. The method of claim 1 wherein the one or more edge services comprise edge services associated with a tenant of the large-scale processing framework cluster.

8. The method of claim 1 wherein initiating execution of the large-scale processing framework cluster and the at least one edge service comprises generating a prompt for credentials associated with the at least one edge service.

9. An apparatus to allocate edge services with large-scale processing clusters, the apparatus comprising:

at least one non-transitory computer readable media; and processing instructions stored on the at least one non-transitory computer readable media that, when executed by a processing system, direct the processing system to:

identify a request for a large-scale processing framework cluster;

determine a type and version of the large-scale processing framework cluster;

identify one or more edge services capable of interacting with the large-scale processing framework cluster based on the type and version of the large-scale processing framework cluster, wherein the one or more edge services provide visualization or management operations for data provided by the large-scale processing framework cluster;

generate a user interface that indicates the one or more edge services available for the large-scale processing framework cluster;

receive a selection of at least one edge service in the one or more edge services; and initiate execution of the large-scale processing framework cluster as one or more virtual nodes and the at least one edge service as one or more additional virtual nodes, wherein the at least one edge service comprises configuration functions that obtain configuration information for the large-scale processing framework cluster, wherein the configuration information comprises addressing information to communicate with the large-scale processing framework cluster, and wherein initiating the execution of the large-scale processing framework cluster and the at least one edge service comprises:

executing the configuration functions to obtain the configuration information for the large-scale processing framework cluster; and allocating permissions to the at least one edge service to access the large-scale processing framework cluster.

10. The apparatus of claim 9 wherein the large-scale processing framework cluster comprises one of an Apache Hadoop cluster or an Apache Spark cluster.

11. The apparatus of claim 9 wherein the one or more edge services comprise at least one Splunk service.

12. The apparatus of claim 9 wherein the one or more edge services comprise one or more edge service images.

13. The apparatus of claim 9 wherein the processing instructions to initiate execution of the large-scale processing framework cluster and the at least one edge service direct the processing system to:

generate a domain name system (DNS) for the large-scale processing cluster, wherein the DNS comprises addressing information for nodes in the large-scale processing cluster; and provide credentials and addressing information for the DNS to the large-scale processing framework cluster and the at least one edge service.

14. The apparatus of claim 9 wherein the processing instructions further direct the processing system to:

identify a plurality of available large-scale processing framework types and versions available to process data for a tenant of a computing environment; and generate a first user interface that indicates the plurality of available large-scale processing framework types and versions, wherein the processing instructions to identify the request for the large-scale processing framework cluster direct the processing system to receive a selection of a large-scale processing framework type and version from the plurality of available large-scale processing framework types and versions.

15. The apparatus of claim 9 wherein the one or more edge services comprise edge services associated with a tenant of the large-scale processing framework cluster.

16. The apparatus of claim 9 wherein the processing instructions to initiate execution of the large-scale processing framework cluster and the at least one edge service direct the processing system to generate a prompt for credentials associated with the at least one edge service.

* * * * *